United States Patent [19]

Smith

[11] Patent Number: 4,900,498

[45] Date of Patent: Feb. 13, 1990

[54] METHOD FOR SEPARATING ELONGATED CONTAMINANTS FROM A STREAM OF MATERIAL

[75] Inventor: Sanford N. Smith, Spartanburg, S.C.

[73] Assignee: Phillips Petroleum Company, Bartlesville, Okla.

[21] Appl. No.: 173,509

[22] Filed: Mar. 25, 1988

[51] Int. Cl.⁴ .............................................. B07B 13/00
[52] U.S. Cl. ........................................ 264/169; 209/2;
  209/659; 209/700; 209/908; 209/910; 209/932
[58] Field of Search .................................... 264/169, 37;
  209/233–235, 240, 241, 700, 908, 910, 1, 2, 606,
  659, 932

[56] References Cited

U.S. PATENT DOCUMENTS 1,666,933  4/1928  Hansen ................................. 209/700
3,278,029  11/1966  Binnix ................................. 209/475
3,756,405  9/1973  Fenska ................................. 209/99
4,251,355  2/1981  Nelson et al. ....................... 209/241

FOREIGN PATENT DOCUMENTS

1123470  8/1968  United Kingdom ................ 209/700

Primary Examiner—Hubert C. Lorin
Attorney, Agent, or Firm—Richmond, Phillips, Hitchcock & Umphlett

[57] ABSTRACT

A method for removing elongated contaminants of polymeric material from a contaminated stream containing pellets and the elongated contaminants, wherein the contaminated stream is passed through an enclosure containing a fixed support member having finger-like projections for snagging the elongated contaminants while allowing the pellets to pass through the enclosure.

4 Claims, 5 Drawing Sheets

METHOD FOR SEPARATING ELONGATED CONTAMINANTS FROM A STREAM OF MATERIAL

BACKGROUND OF THE INVENTION

This invention relates to a method and apparatus for removing contaminants from pellet or granular materials.

In the manufacture of fibers and other products from polymeric materials, these polymeric materials frequently exist at some point in the manufacturing process in the form of beads or pellets.

A pneumatic conveying system is generally used to transport the pellets from one station to another station in the manufacturing process. When pneumatically conveying pellets it is usually necessary to use a high transport velocity to prevent settling and to maintain movement of the pellets. Unfortunately, such a high transport velocity causes frictional heat to build up as the pellets travel and contact a tube or conduit wall, and can cause a melting of some of the pellets. The melted portions of the pellets can adhere to the tube or conduit wall in a thin polymeric layer, which will eventually break loose from the wall, travel with the pellets, and contaminate the process downstream. These thin strips of polymeric material which are deposited on the walls of the tube or conduit by the moving pellets are considered contaminants and are referred to as "snakeskins" if film-like, or "angel hair" if hair-like, or as "bird nests" if hair-like and tangled together.

In a typical commercial fiber plant arrangement, polymer pellets are received in a vacuum receiver, dumped into an extruder feed tank, gravity fed through a line to a proportioner that feeds into an extruder. The contaminants can accumulate at the exit of the extruder feed tank, the entrance and exit of the proportioner, and at any point in any line at which there are valves.

Simple devices such as a screen located at the vacuum receiver exit have been utilized to remove the snake skins or angel hair from the feed. These devices however tend to plug as the polymer pellets tend to bridge and plug the flow. Usually a screen can be used but must be vibrated or pulsed with pneumatic air to prevent the polymer bridging.

It is desirable to provide a simple apparatus that will remove the contaminants from the feed.

It is also desirable to remove these snakeskins, angel hair and bird nests from the polymer pellets in order to obtain a uniform final product.

SUMMARY OF THE INVENTION

It is an object of this invention to provide a simple apparatus and method for removing contaminants from pellet or granular materials.

In accordance with this invention, contaminants such as filmlike or hair-like materials are separated from a stream of material, by passing the stream over an apparatus having at least one projection for snagging the film-like and hair-like contaminants.

The apparatus generally comprises a support member extending into the stream of material, said support member having at least one outwardly extending projection, said projection providing means for snagging said film-like or hair-like material as it passes across said apparatus.

BRIEF DESCRIPTION OF THE DRAWINGS

In the drawings forming a part hereof, wherein like reference characters denote like parts in the various views.

DETAILED DESCRIPTION OF THE INVENTION

Figure 1:
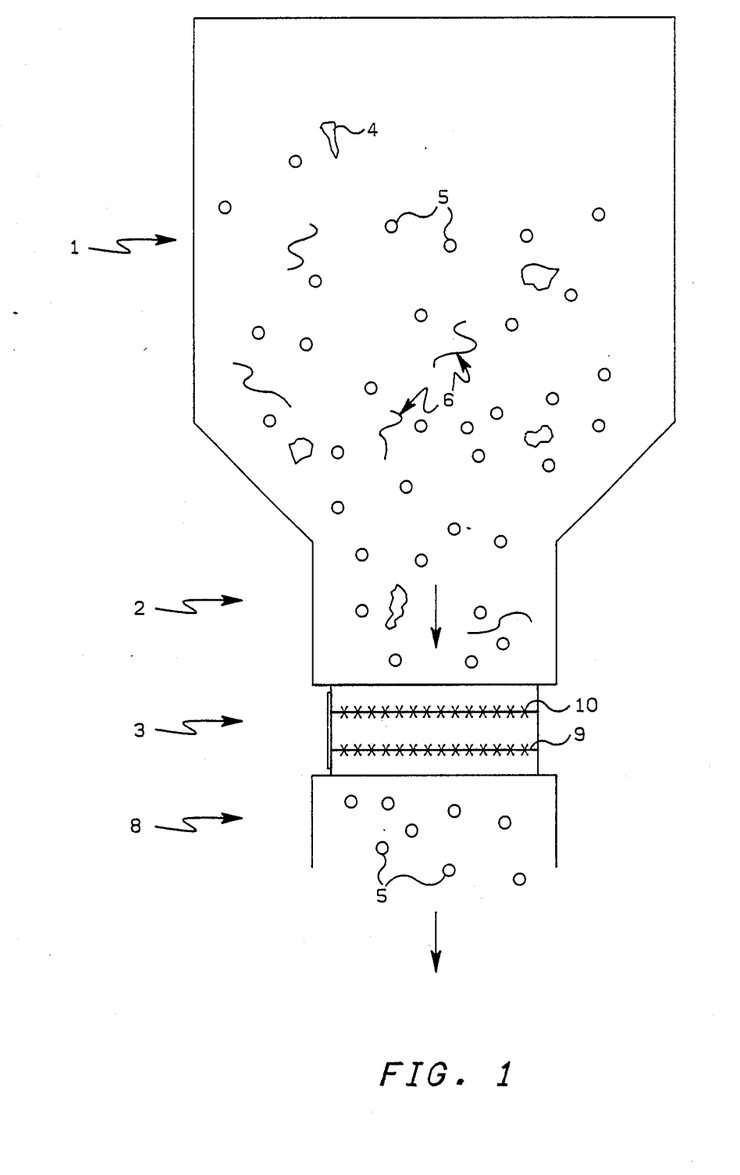
FIG. 1 is a schematic diagram of the method of separating contaminants from pellets in accordance with the invention.

Referring to FIG. 1 which shows a schematic of the method of removing film-like contaminants 4 and hair-like contaminants 6 from a feed of granular, bead-like, or pellet feed 5. The feed contained in storage means 1 is transported to the separation means 3 by way of the transportation means 2. At the separation means 3, the film-like contaminants 4 and hair-like contaminants 6 are snagged on the snagging means 10 affixed to support means 9. Finally the pellets leave the separation means 3 through the exit zone 8.

The contaminants are those materials having at least one dimension elongated or stretched out so that the longest dimension is at least 20 times the shortest dimension. For instance angel hair has a single elongated dimension, its length, which may be in the range of about 3 inches to about 30 inches. More specifically the length is in the range of about 5 to about 12 inches, most specifically in the range of about 6 to about 7 inches. The shortest dimension, i.e. diameter of the angel hair is generally in the range of about 0.005 inches to about 0.05 inches. More specifically the diameter is in the range of about 0.01 inches to about 0.03 inches. That means that generally, for angel hair the length is in the range of about 60 to about 6000 times the diameter.

The thickness of snakeskin is generally in the range of about 0.001 inches to about 0.005 inches. More specifically, the thickness of snakeskin is in the range of about 0.002 to about 0.003 inches. The length of snakeskin can range from about 5 inches to about 8 feet long. More specifically the length is in the range of about 8 inches to about 6 feet long. The width of the snakeskin is generally in the range of about 2 inches to about 12 inches. More specifically, the width is in the range of about 4 inches to about 7 inches. For a snakeskin the longest dimension is generally in the range of about 1000 to about 96,000 times the thickness.

The storage area 1 can be any type of container, storage device or reservoir such as a bin, tank, tray, crib, box, chamber, or any other receptacle capable of holding or storing the feed materials comprising the granular, bead-like or pellet materials 5 (hereinafter "pellets") and the contaminants. These pellets may be generally circular or almost square, but in all events are close enough to spherical to be referred to as having an average diameter which is the average of the longest and the shortest dimension. Generally the average diameter of the pellets is in the range from about 1/16 inch to about 1 inch. Preferably the diameter is in the range from about ⅛ inch to about ¼ inch.

The transporting means 2 can be any known means capable of transporting the feed materials from the storage area 1 to the separation means 3. Such means includes but is not limited to a conveyor system, pneumatic transport system, or even a gravity feed system. Preferably, the storage area 1 is positioned in such a manner that the feed materials can be gravity fed from the storage area 1 to the separation means 3 by a chute, tube, conduit or piping system.

The separation means 3 is generally an apparatus comprising wall means defining an entrance, an exit and an enclosure, and contained within the enclosure is at least one support means 9 having at least one outwardly extending projection 10, comprising snagging means.

The wall means can generally be any shape or form that will allow for passage of the pellet stream through the enclosure. Generally the wall means comprises duct work, piping, framing or some other similar structure, such as a tank or bin.

The wall means will define an entrance, an exit and an enclosure. Contained within the enclosure will be the support means. The enclosure is generally located between the entrance and the exit in such a fashion that the pellet stream will flow through the entrance, into the enclosure and out through the exit.

The entrance and exit can each be a single opening, or a plurality of openings. The openings used can generally be any shape or form that will facilitate the passage of the feed.

The support means having at least one projection can be held in place inside of the enclosure by any known means. Generally the support means is affixed to the wall means, although it could be held in place by structure external to the wall means. For example, a brace, frame or other similar member could extend through the entrance or exit and into the enclosure and thus provides means to hold the support means in place. It could also be possible to hold the support means in place using magnetic type forces.

Generally the support means can be oriented in any direction inside of the enclosure. Preferably the support means is oriented in such a fashion that as the feed comprising the pellets and contaminants passes through the enclosure, at least a part of the feed will pass across at least one of the outwardly extending projections. Most preferably the support member is oriented in such a manner that most of the feed will pass across at least one of the projections.

Orientation of the support means when such means used is a rod or plurality of rods is discussed in more detail in relation to FIGS. 2, 3, 4, 5, and 6.

The outwardly extending projection affixed to the support means can generally be any shape, that will snag the contaminants as they flow by in the stream. Preferably the outwardly extending projections are finger-like. These finger-like projections are discussed in more detail in relation to FIGS. 7, 8, and 9.

The exit zone 8 is generally an area where the pellets 5 that are relatively free of the contaminants can be gathered and can be any type of container that will store the pellets 5 such as a bin, tank, tray, crib, box, chamber or any other receptacle capable of holding or storing the pellets 5.

Alternatively, the exit zone 8 can be a means for transporting the pellets 5 away from the separation means 3 such as but not limited to a conveyor system, pneumatic transporting system or a gravity fed system. Preferably, the separation means 3 is located above the exit zone 8 in such a manner that the pellets are gravity fed from the separation means 3 to the exit zone 8 by a chute, conduit, tube or piping system. Ideally, the pellets 5 will be gravity fed from the exit zone 8 through a chute, conduit, tube or piping system, to the next station in the manufacturing process.

At some point in the separation process, the snagging means will become inundated or saturated with snagged film-like and hair-like materials to such an extent that the efficiency of the separation means 3 to snag the passing contaminants will become greatly diminished. It will then be necessary to clean the snagging means of the snagged contaminants. Generally access to the snagging means is by way of an opening or hatchway. Preferably projection 10 and the support member 9 are installed in such a way as to permit easy removal. Removal of the separation means is discussed in more detail with respect to FIGS. 2, 3 and 5.

Once access to the snagging means has been gained either by an opening or hatchway, or by removing support means 9 and projection 10, they may be cleaned by any known method. Generally the snagging means, projection 10, is purged of snagged contaminants by way of high pressure liquids, or high pressures gases, although the contaminants may be removed by any mechanical device, or even cleaned by hand. Preferably the high pressure liquid used is high pressure water, and the high pressure gas is high pressure air.

Figure 2:
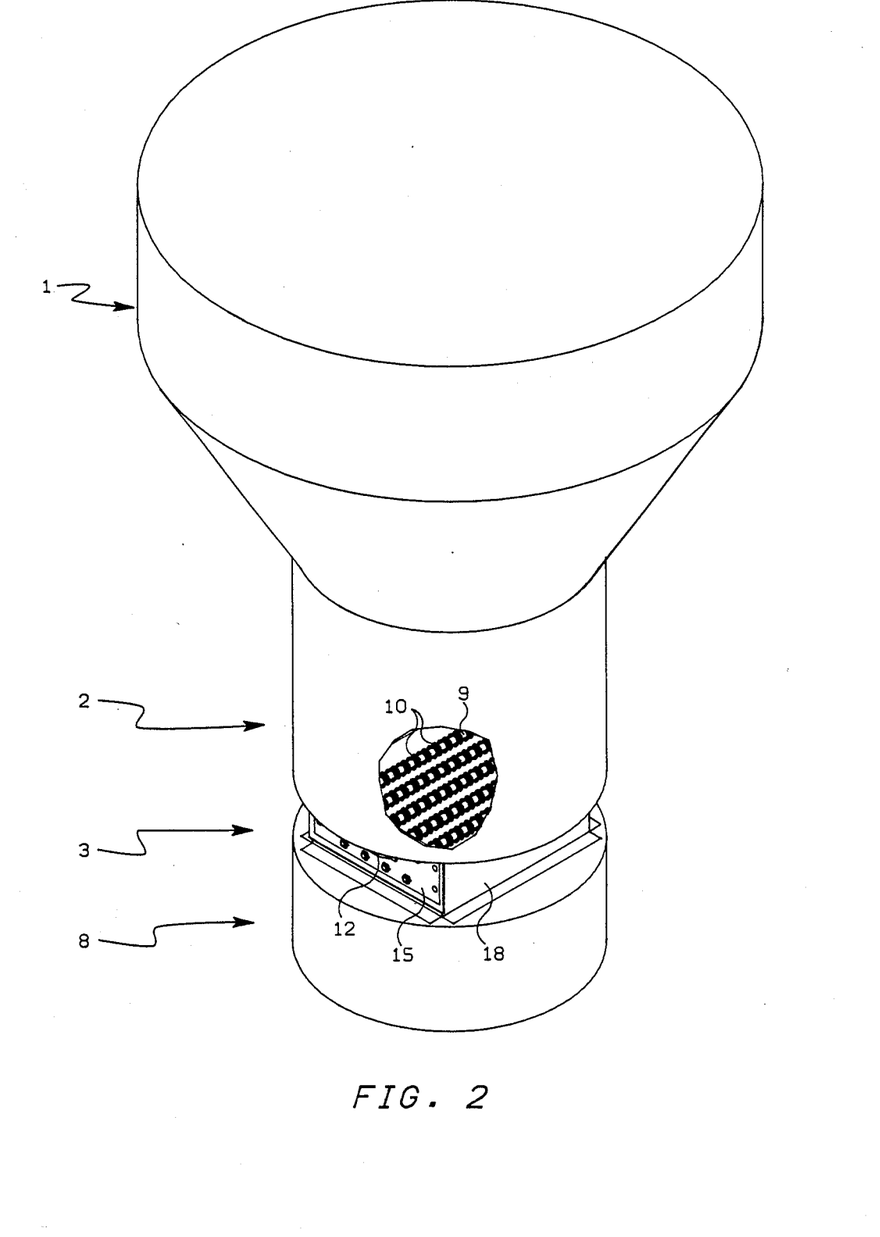
FIG. 2 is a perspective view partially cut away of a typical arrangement of the apparatus of this invention.

Referring to FIG. 2 which shows a typical apparatus set-up for removing elongated contaminants from a pellet stream.

Storage means 1 comprises a cylindrical tank with a conical shaped bottom. The transportation means 2 comprises a tube that provides a means to gravity feed the feed comprising pellets and contaminants to the separation means 3.

The separation means 3 comprises wall means defining an entrance, exit and an enclosure, with the enclosure containing a support member 9 having projections 10. The wall means is a drawer 12 having 4 side walls with no top or bottom walls. The 4 side walls of the drawer define an entrance, that with drawer 12 in place in frame 18, provides communication between the enclosure and transportation means 2. The 4 side walls also define an exit, that with the drawer 12 in place in frame 18, provides communication between the enclosure and exit zone 8.

Support means 9 can generally be any shape or size limited only by the requirement that the support means 9 not unduly impede the flow of the feed. There can generally be any number of support means 9 again limited only by the requirement that there not be so many support means as to unduly impede the feed. The pellets will travel past the support means and the contaminants will tend to become snagged on the projections.

Preferably the support means are rods. Most preferably the support means are straight rods. Generally when a set of rods is used as support means, they can be arranged in any fashion that will allow the projections to snag contaminants from the stream. Preferably the rods are substantially parallel and in a plane normal to an axis defined between the centers of the entrance and exit. Most preferably, there are at least two sets of substantially parallel rods, with each set being in a plane normal to said axis.

Generally as the stream containing the pellets and the elongated contaminants encounters the support means, the stream is divided into a plurality of streams, having a shape very similar to the space between each of the support means.

For example when a set of substantially parallel rods is used, the feed stream will be divided into a multiplicity of streams having a shape very similar to the somewhat rectangular shape between the rods. The width of the shape will be about equal to the clearance between each rod, and the length is about equal to the length of each rod.

Figure 6:
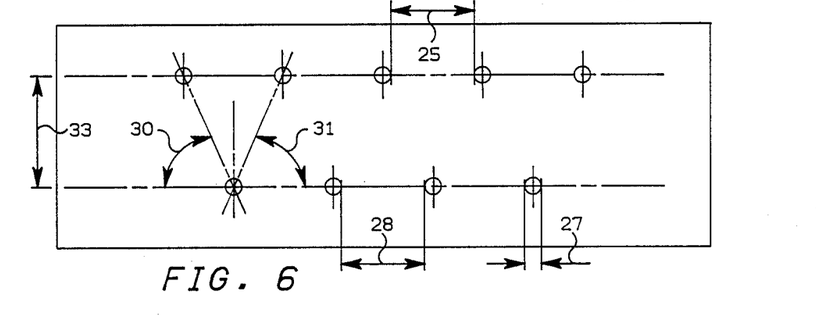
FIG. 6 shows the spatial positioning of the various support members.

As is discussed in more detail in relation to FIG. 6, the projection-to-projection clearance between immediately adjacent rods, clearance 25 (FIG. 6), can be any clearance, but is generally in the range from about 1/32 inch to about 100 inches.

Figure 9:
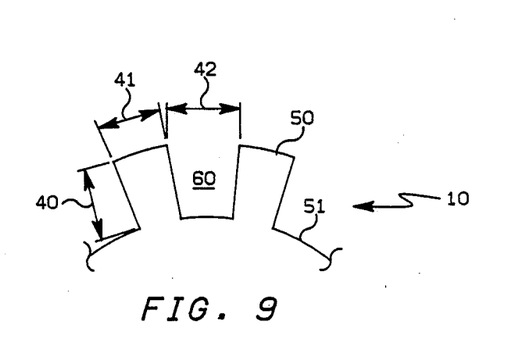
FIG. 9 shows a close-up of the finger-like projections of the collar of FIGS. 7 and 8.

The projections, as is discussed in more detail in relation to FIG. 9, have a length 40 (FIG. 9) that generally is in the range from about 1/16 inch to about 12 inches.

Since the total clearance between adjacent rods will equal the projection-to-projection clearance 25 (FIG. 6) plus the length 40 (FIG. 9) of the projection, then generally this clearance can range from about 3/32 inch to about 112 inches.

The rods can be any length, but generally have lengths in the range from about 1 inch to about 10 feet. Preferably the length is in the range from about 5 inches to about 5 feet, and most preferably in the range from about 8 inches to about 2 feet.

Therefore since the shape into which the stream will be divided into will have a width about equal to the clearance between the rods, and a length about equal to the length of the rods, the length to width ratio of said shape will generally be in the range of about 1 to about 1300. Preferably the ratio will be in the range from about 1.6 to about 100, and most preferably in the range from about 3 to about 20.

Once the stream has been divided into a multiplicity of streams, the snagging means affixed to the support means snags the elongated contaminants from the stream as they pass.

Although they do not have to be rejoined, once the multiplicity of streams leaves the separation means, the streams are generally rejoined into fewer streams in some fashion. Preferably the plurality of streams are rejoined into one stream at the exit zone.

The outwardly extending projections 10 are the snagging means and are finger-like projections that extend radially outward from rods 9 to which they are affixed. It is these projections upon which the contaminants will tend to become snagged. These projections are discussed in more detail with respect to FIGS. 7, 8, and 9.

Drawer 15 is the wall means that provides for the enclosure containing the support means 9 having projections 10. In FIG. 2, support means 9 is affixed to drawer 15. Generally the front wall of drawer 15 can be made of any material, but is preferably a clear glass or clear plastic, to allow for routine visual inspection of the projection 10. Drawer 15 can be removed from frame 18 by use of handle 12. This allows for easy access to projections 10 for cleaning purposes.

Figure 3:
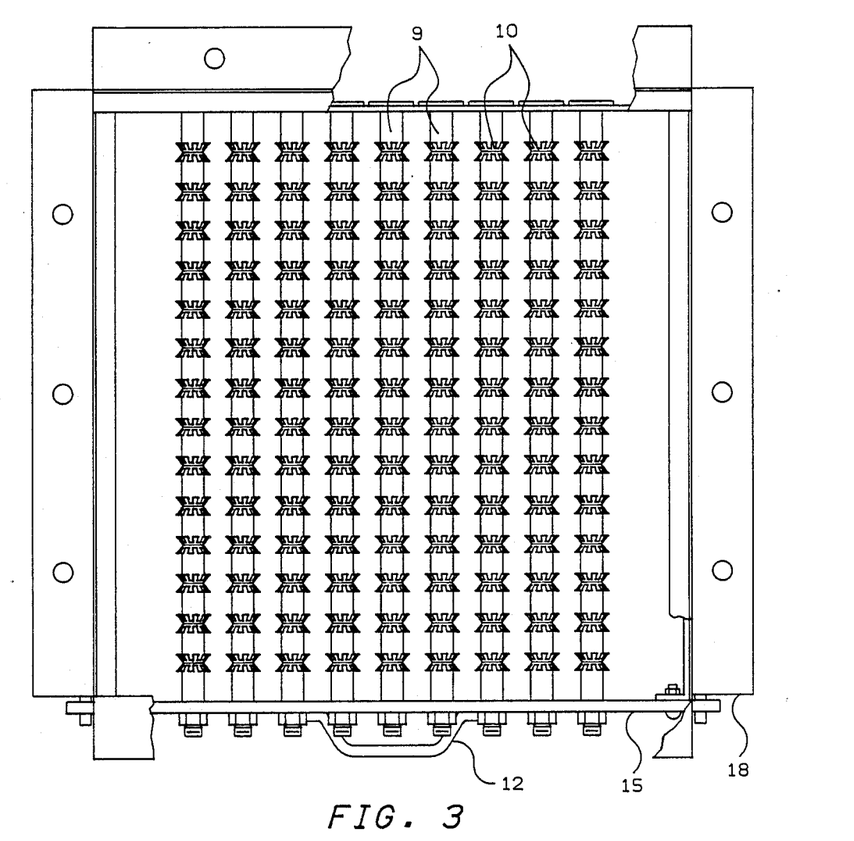
FIG. 3 is a top view of the snagging apparatus contained in a frame and drawer.

Referring to FIG. 3 which shows a top view of drawer 15 containing support means 9 having projections 10, and the accompanying frame 18 on which drawer 15 is supported. Handle 12 provides means by which drawer 15 can be moved to and from frame 18.

The rods 9 as shown are affixed to the drawer 15. The rods 9 are arranged in two sets of essentially parallel rods, with each set being in a separate plane, with each plane being normal to an axis defined between the centers of the top and bottom of drawer 15. Generally any number of rods can be used. However, the number of rods is generally a function of the clearance required between projections on immediately adjacent rods, and the width of the plane in which the rods are contained.

Projections 10 will be affixed to each rod 9. Generally any number of projections can be affixed to each rod. Generally the snagging means will comprise a collar having outwardly extending finger-like projections. The collar is then attached to the rod. The collars having projections are generally spaced along the rod by collars not having projections.

Figure 4:
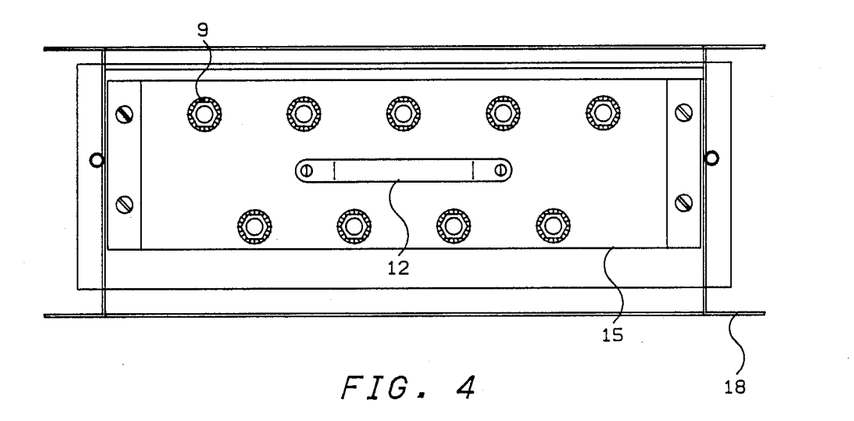
FIG. 4 is a front view of the drawer and frame of FIG. 3.
Figure 5:
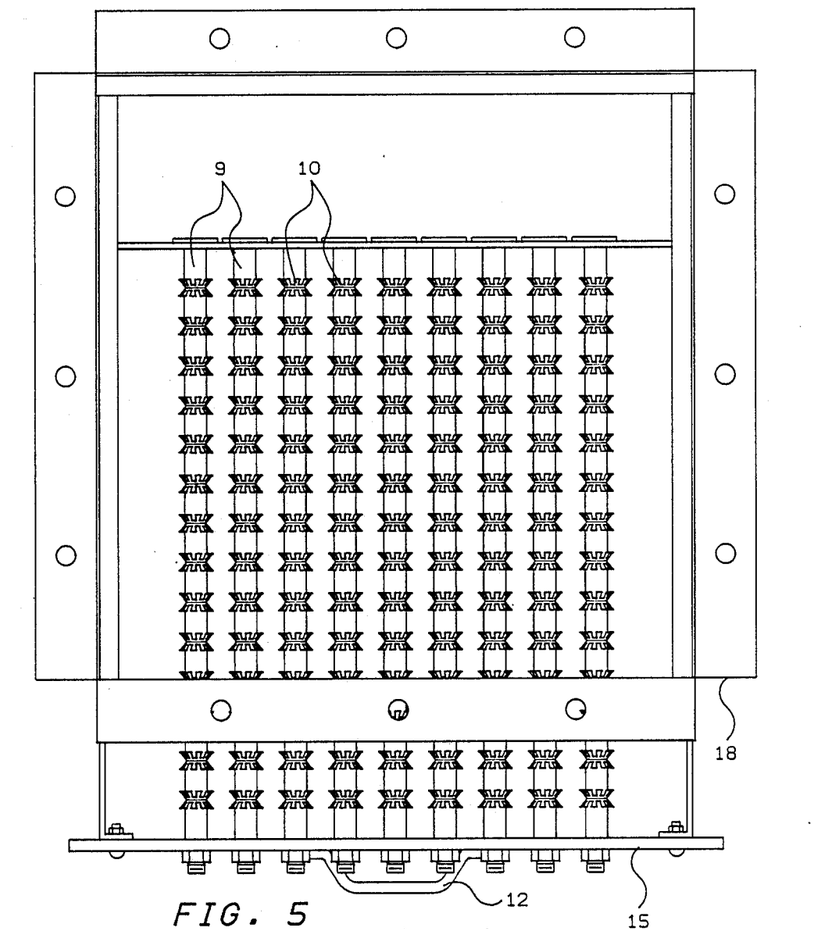
FIG. 5 is a top view of the snagging apparatus of FIG. 3, showing the drawer partially extended to allow for access in order to clean the contaminants from the snagging means.

FIG. 4 is a front view of drawer 15, showing handle 12, support means 9 affixed to the front face of drawer 15, and frame 18.

FIG. 5 is again a top view of drawer 15 containing support means 9 having projections 10. This figure shows how handle 12 can be used to pull out drawer 15 from frame 18 to allow for access to the snagging means 10 so that the contaminants may be cleaned from them.

FIG. 6 is a diagram showing the spatial relationships between the various support means. This figure shows a top set of 5 substantially parallel rods, and a bottom set of 4 substantially parallel rods. Each set is oriented normal to an axis between the centers of the top and bottom openings to drawer 15.

Clearance 25 is the projection-to-projection clearance between immediately adjacent rods. Generally any clearance 25 can be used that will not unduly impede the flow of pellets. Clearly so as not to unduly impede the flow of the pellets, clearance 25 should at least be equal to 1 times the diameter of the pellets that are to pass between the supports. Generally clearance 25 is in the range of about 1 times the pellet diameter to about 800 times the diameter of the pellets.

Generally the clearance 25 will be in the range of about 1/32 of an inch to about 100 inches. Preferably clearance 25 is in the range of about ½ of an inch to about 30 inches. Most preferably, clearance 25 is in the range of about 1 inch to about 5 inches.

Clearance 28 as shown in FIG. 6 is the projection-to-projection clearance between immediately adjacent rods on the bottom row. Generally any clearance 28 can be used that will not unduly impede the flow of pellets. Generally the clearance 28 will be in the range of about 1/32 of an inch to about 25 inches. Preferably clearance 28 is in the range of about ½ of an inch to about 15 inches. Most preferably, clearance 28 is in the range of about 1 inch to about 5 inches.

If any more rows of supports are utilized, then the projection-to-projection clearance between immediately adjacent supports on those additional rows is determined in the same manner as was done for clearance 25 and 28.

Width 27 is the projection-to-projection width for each snagging means. This width can be any width, and will depend upon the diameter of the support means used, and the length of the finger-like snagging means used. Generally any diameter support means can be used. Preferably the diameter of the support means is in the range of about ⅛ inch to about 10 inches. Most preferably the diameter of the support means is in the range of about ¼ inch to about 2 inches. Generally, the length of the finger-like projections can be any length.

Once width 27 and clearances 25 and 28 are determined, the maximum number of rods required in a given plane can be determined mathematically, by dividing the width of the top plane by the sum of clearance 25 and width 27, to give the maximum number of rods for the top row, and by dividing the width of the bottom plane by the sum of clearance 28 and width 27 to give the maximum number of rods for the bottom row.

When clearance 25 is about equal to clearance 28 then the bottom row is generally positioned below the top row such that angle 30 is about equal to angle 31. Otherwise if the clearances are not equal then generally these angles are not equal, but each can be any angle, and each is generally greater than the angle of repose of the pellets in the pellet stream in order to minimize pellet bridging.

As the pellets encounter the first set of support members in the top row, they are diverted around the rods. Although the bottom row can have any number of rods, it will generally contain one more or one less than the top row. Generally they will be offset such that no bottom rod is located vertically below a top rod. The bottom row is generally located a distance 33 below the top row, such that a major part of the diverted flow will encounter a support means in the bottom row. Generally distance 33 ranges from about ¼ inch to about 20 inches or about ¼ pellet diameter to about 320 times the pellet diameter. Preferably distance 33 ranges from about 1 inch to about 10 inches. Most preferably, distance 33 ranges from about 2 inches to about 8 inches.

Figure 7:
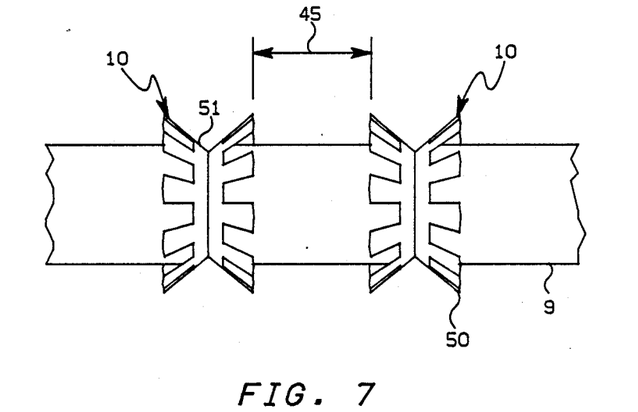
FIG. 7 shows a view of 2 collars having finger-like projections, mounted on a rod.

Referring to FIG. 7 which shows a support rod 9 having a snagging means 10 comprising a collar 51 having finger-like 50 members radially extending from the rod.

Generally there can be any number of these collars 51 on a rod. Of course the width of the collar and the length of the bar will determine the maximum number of these collars that can be affixed to any one rod. Generally there will be from 1 to 100 such collars per foot of rod.

Generally these collars are spaced along the bar such that the projection-to-projection clearance 45 between immediately adjacent collars on any one bar is in the range of about ⅛ inch to about 20 inches. Preferably clearance 45 is in the range of about ¼ inch to about 10 inches, and most preferably in the range of about ½ inch to about 5 inches. In terms of the pellet size, clearance 45 is generally in the range of about ¼ pellet diameter to about 320 pellet diameters. Preferably clearance 45 is in the range of about ½ pellet diameter to about 100 pellet diameter, and most preferably in the range of about 1 pellet diameter to about 80 pellet diameters.

These collars having projections can generally be spaced along the rod by any known means. Preferably, these collars having projections are spaced along the rod by collars not having projections.

As the pellets and contaminants flow into the enclosure containing the support means having projections, the contaminants will tend to become snagged by the finger-like projections 10. The pellets will tend to pass around the support member 9, through clearance 45 between the collars, or between the figures, but in any event, most of the pellets will pass through unimpeded by the support structure or projections. Of course, some of the pellets may momentarily become caught by the supports on the projections, but for the most part will quickly be knocked loose by the passing stream. The contaminants on the other hand will tend not to be knocked loose from the supports or projections by the flow of the passing stream once said contaminants have become snagged.

The contaminants tend not to be able to pass through clearance 45 between the collars, or around the support members, or between the fingers without becoming snagged by a projection.

Figure 8:
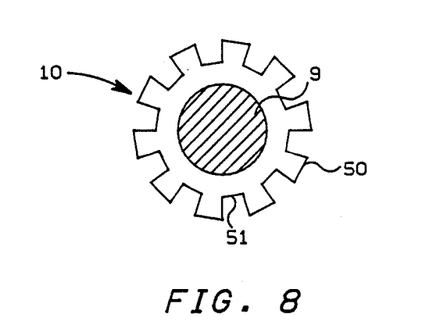
FIG. 8 shows a side view of a collar having finger-like projections mounted on a rod.

FIG. 8 is a side view of support means 9 and projection 10 shown in FIG. 7. This figure shows 10 finger-like 50 projections extending radially outward from support of member 9. Generally any number of projections can be affixed to each collar 51. Preferably projections numbering in the range of about 1 to about 200 per collar are used. Preferably about 5 to about 50 per collar are used. The fingers can be arranged in any fashion on the collar but are generally in a single row. Sometimes the fingers are arranged in a double row as is shown in both this FIG. 8 and FIG. 7. The second row may be offset from the first row as is shown in FIG. 8.

Referring to FIG. 9 which is an expanded view of 2 finger-like members 50 from projection 10 of FIG. 8. The fingers generally are spaced apart a clearance 42 in the range of about 1/16 inch to about 8 inches or about 1/16 of a pellet diameter of about 200 times the pellet diameter. Preferably clearance 42 is in the range of about ⅛ inch to about 2 inches or about ⅛ pellet diameter to about 32 times the pellet diameter. These finger-like 50 members can be attached directly to the rod or attached to a collar 51, which is then carried on the rod.

The fingers are generally rectangularly or cylindrically shaped, and have a length 40 that can be any length, but that is generally in the range of about 1/16 inch to about 12 inches or about 1/16 pellet diameter to about 192 times the pellet diameter. Preferably length 40 is in the range of about ⅛ inch to about 7 inches or about ⅛ pellet diameter to about 112 times the pellet diameter, and most preferably in the range of about 3/16 inch to about 3 inches or about 3/16 pellet diameter to about 48 times the pellet diameter.

The projections have a width 41, if rectangularly shaped, or a diameter 41 if cylindrically shaped that can be any width or diameter, but is generally in the range of about 1/32 inch to about 2 inches or about 1/32 pellet diameter to about 512 times pellet diameter. Preferably width 41 or diameter 41 is in the range of about 1/16 inch to about 1 inch or about 1/16 pellet diameter to about 256 times the pellet diameter, and most preferably in the range of about ⅛ inch to about ¾ inch or about ⅛ pellet diameter to about 21 times the pellet diameter. The projections will have a depth into the page that is in the same range as width 41.

Snagging zone 60 is the zone immediately around and between the snagging means 10 in which, as the elongated contaminants flow through, the contaminants will likely become snagged by the snagging means.

The zone can generally be any shape, but when finger-like projections are used, the snagging zone will be the area between and around each of the fingers, so therefore a portion of the zone between the finger-like projections, will be finger shaped.

EXAMPLE

Polyethylene pellets having diameters of approximately ⅛ inch are stored in an intank blender having the capacity to store about 20,000 pounds of pellets. The pellets are then vacuum fed to a vacuum receiver located just above an inventive apparatus much like the one pictured in FIG. 3, at a rate of 6,000 pounds of pellets per hour. The vacuum receiver has a capacity of about 100 pounds of pellets and will fill and gravity dump the pellets through the inventive apparatus into an extruder feed tank located below the vacuum receiver. From the extruder feed tank, the pellets are gravity fed through a 3 inch diameter aluminum line, and then into a proportioner, and then finally into the extruder, which extrudes 2,000 pounds of fiber per hour.

Without the separator apparatus located immediately after the vacuum receiver, the system will tend to accumulate contaminants at 4 major areas: (1) at the extruder feed tank exit; (2) at the exit of the 3 inch diameter line; (3) at the proportioner exit; and (4) at the valve located in the three inch line. The accumulation of the contaminants would tend to cause the system to plug almost every eight hour shift. After installation of the separator, in which the projections were cleaned once during every eight hour shift, only one plug-up occurred during a three month test.

This invention has been described in detail for the purpose of illustration, it is not to be construed or limited thereby, but is intended to cover all changes and modifications within the spirit and scope thereof.

That which is claimed is:

1. A method of removing an elongated contaminant comprising thin strips of polymeric material from a contaminated stream of material comprising pellets and said contaminant, said method comprising the following steps:

passing said contaminated stream through a snagging zone, said snagging zone comprising an area immediately around and between a plurality of finger-like projections which are positioned in said passing contaminated stream for snagging said elongated contaminant from said contaminated stream; and removing said elongated contaminant from said contaminated stream by snagging said elongated contaminant in said snagging zone.

2. A method in accordance with claim 1 wherein said step of passing said contaminated stream through a snagging zone comprises:

passing said contaminated stream downwardly through a feed zone;

dividing said contaminated stream into a plurality of divided streams by laterally displacing a substantial portion of said pellets and wherein each divided stream has a length to width ratio in the range of from about 1 to about 1,300; and passing said plurality of divided streams through said snagging zone.

3. A method according to claim 2 wherein said pellets comprise an olefin polymer and said contaminant comprises angel hair and snakeskin.

4. A method according to claim 3 additionally comprising the following step:

recombining said plurality of divided streams after passing said plurality of divided streams through said snagging zone to form an uncontaminated stream.

* * * * *